J. D. RAMSEY.
FLUID PRESSURE REGULATOR.
APPLICATION FILED JAN. 18, 1911.

1,022,330.

Patented Apr. 2, 1912.

Witnesses:
Edward Maxwell.
Wm. J. Pike.

Inventor:
Joseph D. Ramsey
by Geo. S. Maxwell,
Atty.

UNITED STATES PATENT OFFICE.

JOSEPH D. RAMSEY, OF BOSTON, MASSACHUSETTS.

FLUID-PRESSURE REGULATOR.

1,022,330.  Specification of Letters Patent.  Patented Apr. 2, 1912.

Application filed January 18, 1911. Serial No. 603,373.

*To all whom it may concern:*

Be it known that I, JOSEPH D. RAMSEY, a citizen of the United States, and resident of Boston, in the county of Suffolk and State of Massachusetts, have invented an Improvement in Fluid-Pressure Regulators, of which the following description, in connection with the accompanying drawings, is a specification, like letters on the drawings representing like parts.

In many situations it is desirable to have a fluid regulator capable of extremely fine adjustments for operating under considerable variations of pressure, as for instance in connection with the so-called bubble fountains, where it is quite essential that the bubble shall be unvarying in height.

Accordingly my present invention relates to a fluid pressure regulator which is particularly well adapted for such purposes. Special provision is made for preventing the jumping or spurting of the fluid (I will hereafter use the word water as conveniently representative of whatever fluid it may be desired to use in the regulator) when first turned on, and also automatic means for maintaining the discharge (for instance the bubble) even or uniform according to the pressure, and means for adapting the regulator to a wide range of pressures, together with preferably externally operable means for adjusting the regulating means without taking the regulator apart.

In the preferred embodiment of my invention, I provide, furthermore, means to control the speed with which the water can enter the regulator as well as the speed of discharge, and also means for varying the time, as relates to the pressure, when the water will begin to flow.

A further feature of practical advantage in my regulator is that all the parts, both inlet and exit, can be adjusted to any pressure and can be adjusted to any strength or calibration of spring. In the more complete embodiment of the invention, it is unnecessary to get at the interior of the regulator in order to adjust the same.

A main characteristic of my invention is its accuracy and fineness or nicety of operation even though operated under extreme water-pressures.

Figure 1:
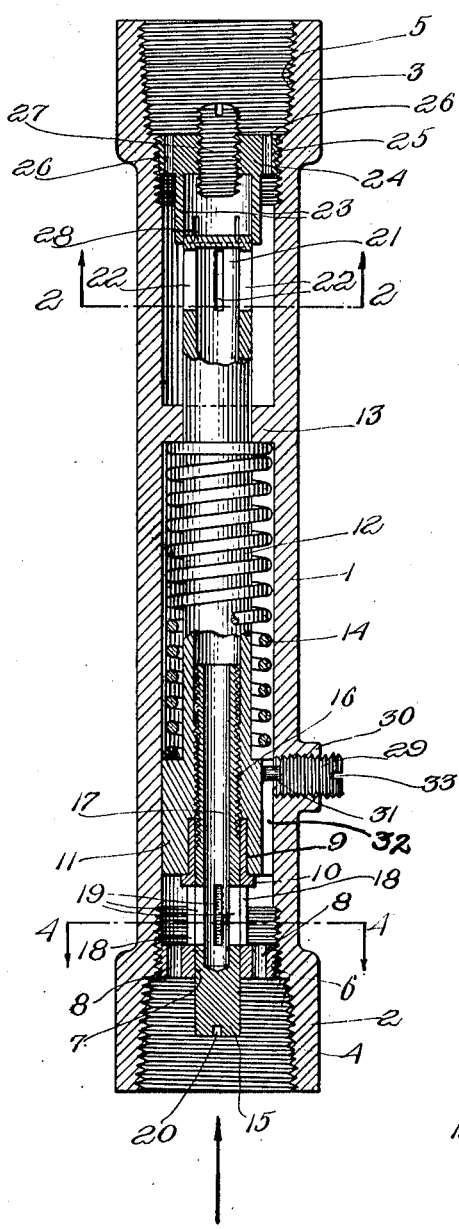
Figure 2:
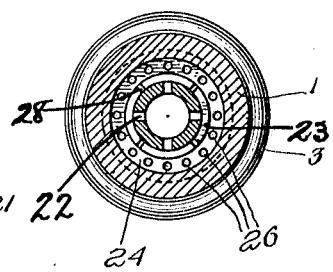
Figure 3:
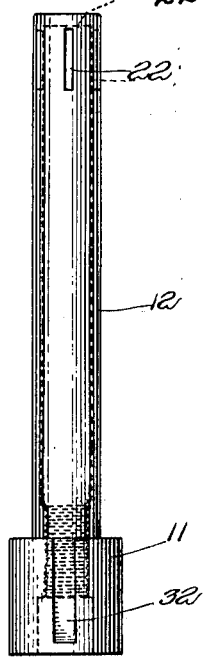
Figure 4:
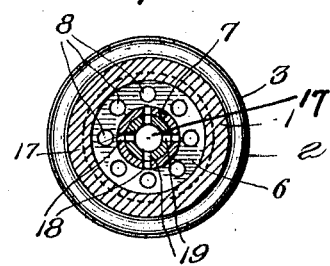
Figure 5:
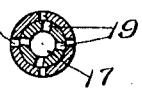

In the drawings, in which I have shown a preferred embodiment of my invention, Figure 1 is a central longitudinal sectional view of the regulator; Fig. 2 is a transverse horizontal sectional view thereof on the line 2—2, Fig. 1; Fig. 3 is a view in side elevation of a portion of the valve mechanism; Fig. 4 is a horizontal cross-sectional view on the line 4—4, Fig. 1; and Fig. 5 is a similar sectional view of the valve portion shown in Fig. 4, illustrating one of the adjustments.

The external casing or housing 1 of the regulator may be of any suitable or preferred shape, being usually tubular, as herein shown, and having its inlet end 2 and outlet end 3 preferably provided with internal threads 4, 5 respectively for suitably coupling the regulator to inlet and outlet pipes or whatever device or devices it is used in connection with. Adjustably threaded into the inlet end of the regulator is a valve disk or stop plate bearing 6 centrally apertured at 7 and provided with a series of relatively small longitudinal openings 8 through which the water may flow whenever it is turned on. This disk 6, besides other advantages, serves the double function of constituting a bearing for the adjacent end of a portion of the valve mechanism and also constituting a pressure muffler whereby, although the maximum amount of water may flow through the holes 8, it cannot flow in a sufficient mass or body to cause the objectionable jumping or spurting which is liable to occur in connection with regulators when water at a heavy pressure is suddenly turned on. The muffler disk 6 subdivides the water into a series of small streams instead of permitting a large amount of water to enter the regulator as a single heavy stream.

Projecting inwardly from the disk 6 and preferably formed integrally therewith is a hollow part 9 provided with a holder or stop 10 normally serving as a seat or stop for the plunger end 11 of the main valve stem or valve tube 12. The plunger end 11 or head of this valve tube has a relatively tight sliding fit in the bore of the casing 1 adjacent the inlet end thereof, and, as herein shown, is guided adjacent its opposite or outlet end by a relatively stationary annular bearing shoulder 13. This tubular valve stem 12 is provided at its opposite ends with the movable parts of the valve mechanism and is moved toward closing position by the impact or pressure of the water which flows through the inlet holes 8 of the muffler disk 6 against the adjacent end or head 11 of said muffler tube 12, a spring 14 tending to maintain the parts in open position in opposition to the closing tendency of the water pressure. The extreme inner end of the hollow part 9 beyond the shoulder 10 preferably has a sliding fit for a short distance within the plunger end or head 11. A relatively small spindle-like valve member 15 is adjustably threaded adjacent its inner end into the inlet end of the tube 12 at 16, and at its outer portion has a smooth sliding fit in the opening 7 of the muffler disk 6 and its tubular part 9, and has a central opening or water passage 17 for conducting the water into the adjacent part of the tube 12 as the water flows into the regulator through the openings 8. To permit this entrance of water, I provide longitudinal slots or ports 18 in the member 9, four thereof being herein indicated and corresponding slots or ports 19 through the walls of the valve member 15 so that when the parts are in the position shown in Fig. 1, the two sets of ports or slots 18, 19 register with each other, or in other words are open for the full flow of water. Any suitable means for adjusting the member 15 may be provided, a screw driver notch or slit 20 being herein shown for convenience at the outer end thereof. As herein shown, the valve tube 12 is closed at its opposite or extreme forward end 21 and adjacent thereto is provided with a series of outlet slots or ports 22, said end of the tube 12 having a sliding fit in a relatively stationary tubular member 23 which extends inwardly from an adjacent pressure muffler or transverse disk 24 threaded into the outlet end of the regulator at 25, and provided with discharge holes or passages 26 which serve very much the same purpose as the holes 8 in the somewhat similar disk 6 at the other end of the regulator. Preferably I provide an adjusting stop 27 centrally threaded through the disk 24 for the end 21 of the valve tube 12 to strike against for limiting the closing movement thereof in accordance with the requirements of any given situation. Also preferably the cup-like cut-off walls 23 of the part 24 are provided with relatively narrow slots 28 normally out of alinement with the slots 22 but being capable of being turned so as to aline more or less therewith, as may be desired for extremely fine regulation of the discharge.

A further important feature of the preferred embodiment of my invention is a provision for externally regulating or adjusting the apparatus. While this may be provided in many different mechanical forms, I have herein shown a stud 29 threaded into a boss 30 and through the wall of the casing and provided at its inner end with an eccentrically positioned pin or finger 31 occupying a longitudinal groove or way 32 in the head 11 of the valve tube, so that when the operator turns said stud 29, the valve tube and its ports or slots will be correspondingly shifted. A screw driver slot 33 is provided in the end of said stud as a sufficiently convenient means for permitting it to be turned. Preferably the groove 32 in the head 11 is slightly diagonal to its longitudinal axis, as clearly shown in Fig. 3, for providing a further refinement of adjustment which will be more clearly apparent in connection with the description of the operation.

In use, it being supposed that the regulator is screwed onto a supply pipe at 4 and that the parts are assembled and adjusted substantially as shown in Fig. 1, it will be understood that when the water is first turned on its force as a solid stream is broken by the subdivision of the water into a series of relatively small streams by the openings 8 in the muffler disk or stop plate 6. This subdivision or splitting up of the inflowing water into relatively small segregated parts further tends to prevent or minimize the water shocks or impacts familiarly known as "water hammering." Further this entrance muffler or baffle plate in connection with the similar one 24 at the delivery end, causes the flow of water through the device to be much more even thus rendering its action on the automatic valve mechanism more precise and uniform. As the water passes through the holes 8 to the opposite side of said disk 6, the water flows through the alined slots or ports 18, 19, in the two concentric and relatively movable tubular members 9 and 15, and at the same time the pressure of the stream is exerted against the plunger end of the head 11 of the valve tube 12, thereby causing said valve tube to move forward in the casing 1 against the resistance of the spring 14 in accordance with the pressure of the water, whatever that may be. The first effect of this movement of the valve tube 12 is to cut off or contract the effective passage of the inlet ports, or in other words it tends to close the inlet valve in accordance with the pressure of the water. If the water pressure is exactly the same as the resistance of the spring 14, then of course the regulator valve remains open. The parts are normally adjusted for the lowest water pressure with which the regulator is intended to be used, so that, for said lowest pressure, the regulator valves remain open and tend to close upon any increase of the water pressure above the minimum. As the water passes down through the tube 12, it passes out through the outlet ports 22. If the water pressure is above the minimum for which the regulator is set, the valve tube 12 will be moved forward, as already stated, thereby causing the outlet ports 22 to be proportionately closed, the same as already explained with reference to the inlet ports. As herein shown, this closing movement of the outlet ports is caused by the movement of the openings or ports 22 within the walls 23 of the disk 24. Under maximum water pressure, the valve tube 12 is moved by said water pressure until its end 21 strikes against the adjusting stop 27. If the maximum closing movement is to be increased, this stop 27 may be screwed out to permit the end 21 to move inwardly to such an increased extent as may be desired. This is accomplished without varying the original relative adjustment of the inlet ports and outlet port. On the other hand, if it is desired to have the outlet port remain open to a greater extent than the inlet ports, in the operation of the regulator, this is accomplished by the adjustment of the disk 6 or the disk 24 or both of them. The primary purpose, however, of the adjustment of the disk 6 is to adjust the regulator at the start in accordance with the requirements of the particular spring 14 used therein. As is well known, it is practically impossible to have a large number of springs all with the same strength or resiliency, and accordingly it has been the usual practice to file these springs off or cut them off by repeated trials until all are about alike. The necessity for this tedious and expensive practice is entirely obviated by my construction. The disk 6 is screwed in or out to the exact distance required by the particular spring 14 which happens to be selected for any given regulator without changing the position of the movable part 15 with relation to the normally stationary parts 6—9. If there is too great flow at low pressure, the valve member 15 is turned very slightly so as to turn the ports 19 slightly out of alinement with the ports 18, thereby rendering the water passages therethrough correspondingly smaller. If at medium pressure not enough water is flowing, as for instance if the bubble is not sufficiently high, the disk 24 is preferably turned slightly so as to bring the slits 28 more or less into alinement with the ports 22, thereby affording a freer passage for the water. On the other hand, if there is too great flow at high pressure, the disk 24 is turned inwardly to such an extent as may be required in order that its walls 23 may cover or close such an extent of the ports 22 as may be required in order to bring the flow to the exact amount required.

Having assembled the regulator and adjusted it as explained above, let it be supposed that it is sent out set for a two-inch bubble. If now the user decides that he does not wish a two-inch bubble, there is no necessity of his sending the regulator back to the manufacturer, but he simply turns the stud 29 slightly until he has thereby rotated the tube 12 and the valve member 15 to partially close the ports 18 and 19. In other words, by turning the stud 29, the regulator can be adjusted externally with the same effect as previously explained by turning the disk 6, the latter movement turning the outside member 9 while the inside member 15 remains stationary, whereas the stud adjustment turns the inside member while the outside member remains stationary. Thus I provide one adjustment which is availed of in assembling and originally setting the regulator, and another adjustment which is external and is used after the regulator is assembled and installed. A further function of the pin 31 and slot 32 construction is that thereby the valve tube 12 is maintained in an absolutely unvarying path of reciprocation so that the ports 19 cannot accidentally turn with relation to the ports 18 but they are obliged to remain accurately as set. A further feature of construction remains to be explained, viz. that feature which resides in preferably having the slot 32 slightly oblique to the direction of length of the valve tube 12. This is for the purpose of giving extreme delicacy and accuracy of regulation under a wide range of pressures. For instance under a limited range of pressure, the mechanism already described is ample, but if the regulator is liable to be used from a minimum of twelve pounds pressure to a maximum of one hundred and forty pounds pressure more or less, the ports 18 and 19 will be given an additional increment of closing movement as the parts move forward toward maximum pressure position. The great difficulty with a regulator is to get water enough at low pressure and yet not too much at high pressure, and I find that the transition of valve movement necessary in going gradually from extremely low to extremely high is simplified materially by this adjustment which allows the valve to be wide open at low pressure and closes the ports proportionately and with a slightly increasing increment as the pressure increases. Another reason for this construction is that, as is well known, the smaller the bubble which is desired, the more sensitive will be the adjustment required; and my invention provides this extreme sensitiveness. In fact the extreme difficulty of maintaining a uniform bubble under all conditions in the average bubble fountain, is a primary occasion of my invention, although it will be understood that my regulator has other fields of usefulness.

Having described my invention, what I claim as new and desire to secure by Letters Patent is:

1. A regulator, comprising a casing, a valve consisting of a relatively movable part and a relatively stationary part, the latter adjustably mounted in said casing, a spring for yieldingly holding said movable part in opposition to the water pressure, and means for adjusting the position of both said valve parts in the casing in accordance with the requirements of said spring without changing the relative position of said valve parts.

2. A regulator, comprising a casing, a spring therein, a movable valve part within the casing engaging said spring and provided with inlet ports, and adjusting means for varying the normal position of said valve part with reference to its inclosing casing and at the same time regulating the tension of said spring.

3. A regulator, comprising a casing, a movable valve tube inclosed thereby, a spring between the two for holding the tube yieldingly in opposition to the water pressure, and adjusting means for varying the position of said tube and thereby varying the tension of said spring, said means being inclosed and protected by said casing.

4. A regulator, comprising a casing, a movable valve tube inclosed thereby, a spring between the two for holding the tube yieldingly in opposition to the water pressure, adjusting means for varying the position of said tube with reference to the casing and thereby varying the tension of said spring, and coöperating valve parts movable with said adjusting means and tube as the adjusting means is adjusted, said parts being inclosed and protected by said casing.

5. A regulator, comprising a casing, a movable valve tube inclosed thereby, a spring between the two for holding the tube yieldingly in opposition to the water pressure, and adjusting means for varying the position of said tube relative to said casing and thereby varying the tension of said spring, said tube and said adjusting means being provided with coöperating portions of the valve mechanism and said parts being inclosed by said casing.

6. In a regulator, valve mechanism comprising a movable port-carrying member and a relatively stationary port-carrying member for the passage of the water through said ports when in mutual alinement, and means for adjusting said ports longitudinally with relation to each other.

7. In a regulator, valve mechanism comprising a movable port-carrying member and a relatively stationary port-carrying member for the passage of the water through said ports when in mutual alinement, and means for adjusting said ports laterally with relation to each other.

8. In a regulator, valve mechanism comprising a movable port-carrying member and a relatively stationary port-carrying member for the passage of the water through said ports when in mutual alinement, and mechanism for adjusting said ports longitudinally and also laterally with relation to each other.

9. In a regulator, valve mechanism comprising a movable port-carrying member and a relatively stationary port-carrying member for the passage of the water through said ports when in mutual alinement, and external adjusting means for varying the normal position of one port-carrying member with relation to the other for changing the size of the water passage provided thereby.

10. In a regulator, valve mechanism comprising a movable port-carrying member and a relatively stationary port-carrying member for the passage of the water through said ports when in mutual alinement, and external adjusting means for shifting one port-carrying member with relation to the other whereby the size of the resulting water passage is correspondingly varied.

11. In a regulator, valve mechanism comprising a relatively stationary tubular member and a relatively movable tubular member, said two members having coöperating ports adapted to aline with each other for the passage therethrough of water, and means for axially rotating one member with relation to the other for shifting the parts more or less out of alinement to vary the water flow.

12. In a regulator, a casing, a valve tube mounted to reciprocate therein, a member carried by said tube provided with inlet ports adjacent one end, said tube at a remote portion having outlet ports, means located adjacent the former ports and other means adjacent the latter ports for coöperating with said inlet ports and outlet ports respectively in opening and closing the same as the valve tube is moved by the water pressure.

13. In a regulator, a casing, a valve tube mounted to reciprocate therein, a spring for normally maintaining said tube in valve-open position in opposition to the water pressure tending to close the regulator, a relatively stationary tubular part adjacent the inlet end of said valve tube provided with inlet ports, a hollow spindle-like valve member mounted in the inlet end of said valve tube and provided with ports adapted to aline with said inlet ports, and adjusting means for relatively shifting said respective ports for varying the size of the water passages.

14. In a regulator, a casing, valve mechanism comprising a relatively stationary part and a movable part provided respectively with normally alining ports for the passage therethrough of water, said movable part being responsive to the water pressure, and means for axially shifting one of said parts with relation to the other as said movable part is moved by the water pressure, whereby, in addition to the closing movement of one port with relation to the other when the water pressure increases, said ports are given a separate increment of closing movement.

15. In a regulator, a casing, a valve tube mounted to reciprocate in said casing, a spring to hold said tube in valve open position, and adjustable means for positively limiting the movement of said tube in the valve closing direction, said parts being inclosed by said casing and formed to permit said means to be adjusted without affecting said spring.

16. In a regulator, a casing, a valve tube mounted to reciprocate in said casing, means adjustably limiting the movement of said tube in closing, and means for adjustably limiting the movement of said tube in opening, the latter means being arranged to operate without interfering with the valve ports.

17. In a regulator, valve mechanism, including a movable tubular member through which the water flows, provided at its outlet end with outlet ports, and a relatively stationary endwise adjustable tubular member for receiving said outlet end therewithin whereby the movement of said movable tubular member coöperates therewith to close and open the outlet ports.

18. In a regulator, valve mechanism, including a movable tubular member through which the water flows, provided at its outlet end with outlet ports, and a relatively stationary adjustable tubular member for receiving said outlet end therewithin whereby the movement of said movable tubular member coöperates therewith to close and open the outlet ports, said adjustable member containing slots adapted to be brought into more or less accurate alinement with said ports for giving an added variation of the effective port openings for the flow of the water.

In testimony whereof, I have signed my name to this specification, in the presence of two subscribing witnesses.

JOSEPH D. RAMSEY.

Witnesses:
 GEO. H. MAXWELL,
 EDWARD MAXWELL.